United States Patent
Pikle et al.

(10) Patent No.: US 10,383,786 B2
(45) Date of Patent: Aug. 20, 2019

(54) UTILIZING A HUMAN COMPOUND EYE USING AN INTERNET OF THINGS ("HCEI") FOR OBSTACLE PROTECTION OF A USER

(71) Applicant: INTERNATIONAL BUSINESS MACHINES CORPORATION, Armonk, NY (US)

(72) Inventors: Anand Pikle, Pune (IN); Amol Dhondse, Pune (IN); Gandhi Sivakumar, Bentleigh (AU); Maharaj Mukherjee, Poughkeepsie, NY (US); Faried Abrahams, Laytonsville, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/844,981

(22) Filed: Dec. 18, 2017

(65) Prior Publication Data

US 2019/0183720 A1   Jun. 20, 2019

(51) Int. Cl.
| | |
|---|---|
| *A61H 3/06* | (2006.01) |
| *G01S 15/87* | (2006.01) |
| *G09B 21/00* | (2006.01) |
| *G01C 21/20* | (2006.01) |
| *H04N 5/225* | (2006.01) |

(52) U.S. Cl.
CPC ............. *A61H 3/061* (2013.01); *G01S 15/87* (2013.01); *G09B 21/006* (2013.01); *G01C 21/206* (2013.01); *H04N 5/2252* (2013.01)

(58) Field of Classification Search
CPC ...... A61H 3/061; G09B 21/006; G01S 15/87; H04N 5/2252; G01C 21/206
See application file for complete search history.

(56) References Cited

U.S. PATENT DOCUMENTS

| | | | | | |
|---|---|---|---|---|---|
| 3,996,950 | A | * | 12/1976 | Mier | A45B 3/00 |
| | | | | | 135/66 |
| 4,280,204 | A | * | 7/1981 | Elchinger | A61H 3/061 |
| | | | | | 135/76 |
| 6,055,048 | A | * | 4/2000 | Langevin | A61H 3/061 |
| | | | | | 356/237.1 |
| 6,196,917 | B1 | * | 3/2001 | Mathias | A63F 13/10 |
| | | | | | 463/2 |

(Continued)

FOREIGN PATENT DOCUMENTS

GB    2297253 A    7/1996

OTHER PUBLICATIONS

Bourbakis, "Sensing Surrounding 3-D Space for Navigation of the Blind," IEEE Engineering in Medicine and Biology Magazine, Jan./Feb. 2008 (7 pages).

*Primary Examiner* — Brian E Miller
(74) *Attorney, Agent, or Firm* — Griffiths & Seaton PLLC

(57) ABSTRACT

Embodiments for utilizing a human compound eye using internet of things ("HCEI") for obstacle protection of a user by a processor. One or more objects may be determined within an obstacle threshold distance in relation to a user according to data captured from one or more internet of things (IoT) devices associated with a wound dressing, a mobility assistance device, or a combination thereof. The user may be alerted of the one or more objects within the obstacle threshold distance.

18 Claims, 6 Drawing Sheets

(56) References Cited

U.S. PATENT DOCUMENTS

| | | | | |
|---|---|---|---|---|
| 6,671,226 B1 * | 12/2003 | Finkel | | A61H 3/061 |
| | | | | 367/116 |
| 6,710,706 B1 * | 3/2004 | Withington | | A61F 11/04 |
| | | | | 340/407.1 |
| 6,867,697 B2 * | 3/2005 | Nanayakkara | | A61H 3/061 |
| | | | | 340/4.11 |
| 8,810,407 B1 * | 8/2014 | Nolan | | A61H 3/02 |
| | | | | 340/407.1 |
| 9,037,400 B2 | 5/2015 | Tolstedt et al. | | |
| 9,370,459 B2 | 6/2016 | Mahoney | | |
| 9,436,931 B2 * | 9/2016 | Welles | | G06Q 10/10 |
| 10,134,304 B1 * | 11/2018 | Beals | | A61H 3/068 |
| 2008/0239870 A1 * | 10/2008 | Dubuis | | G01S 7/539 |
| | | | | 367/21 |
| 2014/0180173 A1 * | 6/2014 | Sullivan | | A61B 5/0002 |
| | | | | 600/595 |
| 2014/0251396 A1 | 9/2014 | Subhashrao et al. | | |
| 2015/0323325 A1 * | 11/2015 | Caporizzo | | G01S 7/497 |
| | | | | 701/400 |
| 2016/0005334 A1 | 1/2016 | Guo | | |
| 2016/0063893 A1 * | 3/2016 | Kanuganti | | G09B 21/001 |
| | | | | 348/62 |
| 2016/0065937 A1 * | 3/2016 | Bae | | G01B 11/14 |
| | | | | 348/46 |
| 2016/0166438 A1 | 6/2016 | Rovaniemi | | |
| 2016/0171303 A1 * | 6/2016 | Moore | | G06K 9/00671 |
| | | | | 382/153 |
| 2016/0171883 A1 * | 6/2016 | Kvetny | | G09B 21/007 |
| | | | | 340/944 |
| 2016/0259027 A1 * | 9/2016 | Said | | H04W 4/33 |
| 2016/0275816 A1 * | 9/2016 | Harish | | G09B 21/007 |
| 2016/0275817 A1 * | 9/2016 | Chen | | G09B 21/006 |
| 2016/0334800 A1 * | 11/2016 | Han | | G05D 1/0274 |
| 2016/0357187 A1 * | 12/2016 | Ansari | | G01S 15/931 |
| 2017/0164224 A1 * | 6/2017 | Min | | H04W 4/70 |
| 2017/0173791 A1 * | 6/2017 | Dalibard | | B25J 9/1674 |
| 2017/0252256 A1 * | 9/2017 | Henshue | | A61H 3/061 |
| 2017/0270347 A1 * | 9/2017 | Lee | | G06K 9/00201 |
| 2017/0270827 A1 * | 9/2017 | Channabasappa | | A43B 3/0005 |
| 2017/0318360 A1 * | 11/2017 | Tran | | G01L 5/0052 |
| 2017/0319426 A1 * | 11/2017 | Dayal | | G01C 21/3679 |
| 2018/0038697 A1 * | 2/2018 | Li | | B25J 9/00 |
| 2018/0061137 A1 * | 3/2018 | Jung | | G05D 1/00 |
| 2018/0164801 A1 * | 6/2018 | Kim | | B64C 39/02 |
| 2018/0168911 A1 * | 6/2018 | Chiu | | A61H 3/061 |
| 2018/0243157 A1 * | 8/2018 | Takada | | A61H 3/06 |

* cited by examiner

UTILIZING A HUMAN COMPOUND EYE USING AN INTERNET OF THINGS ("HCEI") FOR OBSTACLE PROTECTION OF A USER

BACKGROUND OF THE INVENTION

Field of the Invention

The present invention relates in general to computing systems, and more particularly to, various embodiments for utilizing a human compound eye using an internet of things ("HCEI") for protecting users from objects by a processor.

Description of the Related Art

In today's society, many persons suffer various limitations relating to vision and often times requiring vision correction or augmentation. Moreover, many persons may also require assistance from other persons to assist with identifying objects, hazards, or other conditions potentially exposing a person with vision impairment from causing harm to themselves while avoiding these unseen dangers. The advent of computers and networking technologies have made possible assisting persons suffering various physical limitations.

SUMMARY OF THE INVENTION

Various embodiments for utilizing a human compound eye using an internet of things ("HCEI") for obstacle protection of a user by a processor are provided. In one embodiment, by way of example only, a method for protecting a user from one or more objects using an HCEI device, again by a processor, is provided. One or more objects may be determined within an obstacle threshold distance in relation to a user according to data captured from one or more internet of things (IoT) devices associated with a wound dressing, a mobility assistance device, or a combination thereof. The user may be alerted of the one or more objects within the obstacle threshold distance.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
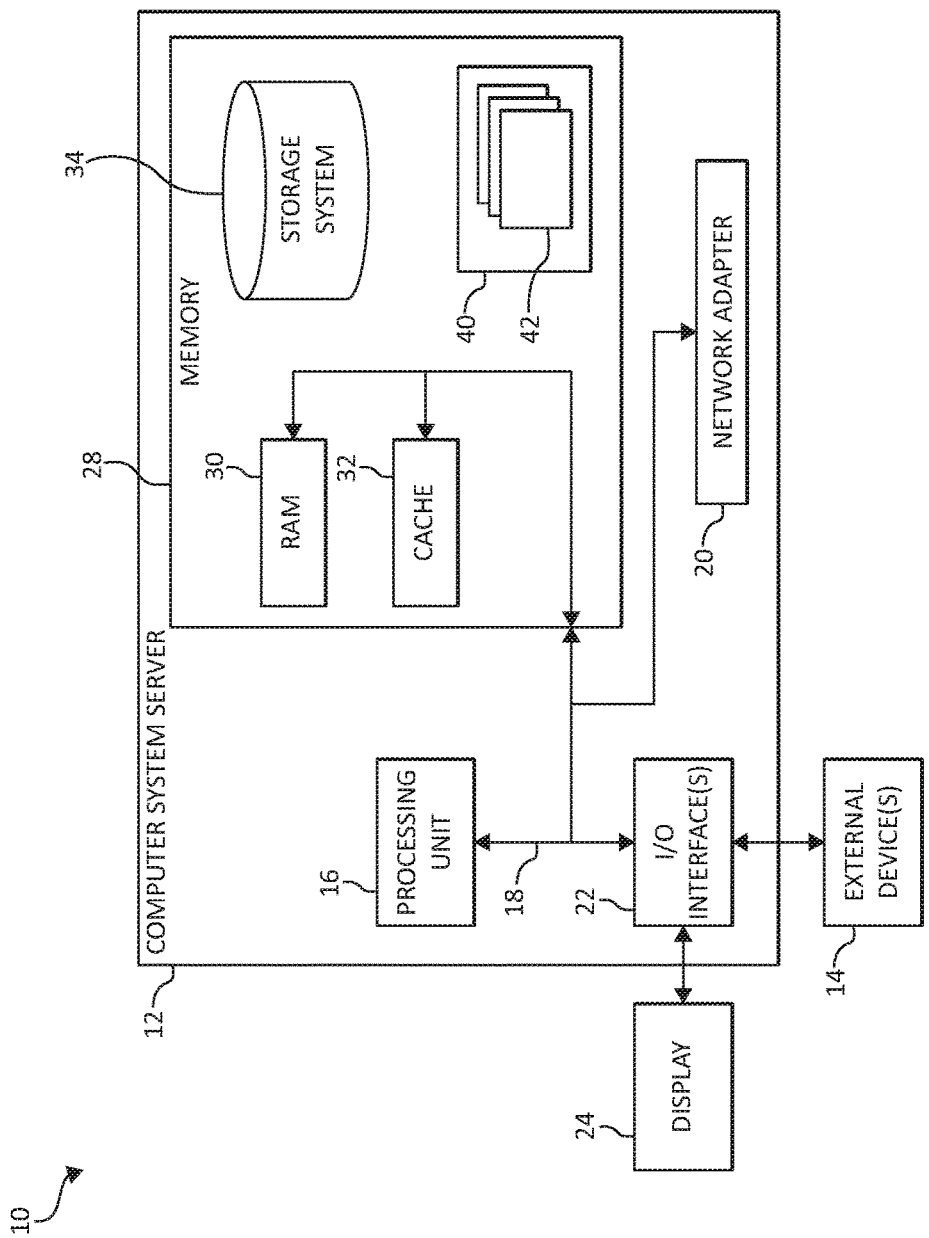
FIG. 1 is a block diagram depicting an exemplary cloud computing node according to an embodiment of the present invention.

In today's interconnected and complex society, computers and computer-driven equipment are more commonplace. The "Internet of Things" refers to the interconnection of uniquely-identifiable embedded devices within the Internet infrastructure. In an Internet of Things ('IoT'), a wide variety of devices may exist. Each device may include different attributes, different capabilities, be located at different places, and so on. IoT can be thought of as a dynamic global network infrastructure with self-configuring capabilities based on standard and interoperable communication protocols in which both physical and virtual things have identities and attributes. Such physical and virtual things can be seamlessly integrated into traditional networks. IoT can make use of radio-frequency identification ('RFID') technologies to identify and inventory each thing in the IoT. IoT can also make use of other technologies such as barcodes as well.

The advent IoT devices have enabled intelligence across many devices handled by humans in day-to-day life. For example, in day-to-day living, when a person is injured there is a need to guard the wound or injury both when the person is conscious and performing activities and/or during a period of unconsciousness such as, for example, when sleeping. For example, a wound or injury in the feet area may need to be guarded against obstacles such as, for example, while walking. As an additional example, a person having recently received cataract surgery may require special care to protect against rubbing the wound around the eye area or while asleep.

Similarly, a person with visual challenges may need to be warned or alerted to approaching obstacles, hazards, and/or dangers, which may severely injure or cause harm to the person. Accordingly, the present invention provides a "human compound eye using an internet of things" ("HCEI") mechanism to identify approaching obstacles and notifies the individual or others to take necessary action so as to protect a wounded/injured area or guide the visually challenged person.

The mechanisms of the illustrated embodiments provide enhancing mechanisms for utilizing one or more HCEIs for obstacle protection of a user by a processor. In one embodiment, by way of example only, a method for protecting a user from one or more objects using an HCEI device, again by a processor, is provided. One or more objects may be cognitively determined within an obstacle threshold distance in relation to a user according to data captured from one or more internet of things (IoT) devices associated with a wound dressing, a mobility assistance device, or a combination thereof. The user may be alerted of the one or more objects within the obstacle threshold distance.

In an additional aspect, cognitive or "cognition" may refer to a mental action or process of acquiring knowledge and understanding through thought, experience, and one or more senses using machine learning (which may include using sensor based devices or other computing systems that include audio or video devices). Cognitive may also refer to identifying patterns of emotions and/or behaviors, leading to a "learning" of one or more events, operations, or processes. Thus, the cognitive model may, over time, develop semantic labels to apply to observed emotions and/or behaviors and use a knowledge domain or ontology to store the learned observed emotions and/or behaviors. In one embodiment, the system provides for progressive levels of complexity in what may be learned from the one or more events, operations, or processes.

In an additional aspect, the term cognitive may refer to a cognitive system. The cognitive system may be a specialized computer system, or set of computer systems, configured with hardware and/or software logic (in combination with hardware logic upon which the software executes) to emulate human cognitive functions. These cognitive systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. A cognitive system may perform one or more computer-implemented cognitive operations that approximate a human thought process while enabling a user or a computing system to interact in a more natural manner. A cognitive system may comprise artificial intelligence logic, such as natural language processing (NLP) based logic, for example, and machine learning logic, which may be provided as specialized hardware, software executed on hardware, or any combination of specialized hardware and software executed on hardware. The logic of the cognitive system may implement the cognitive operation(s), examples of which include, but are not limited to, question answering, identification of related concepts within different portions of content in a corpus, and intelligent search algorithms, such as Internet web page searches.

In general, such cognitive systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and cognition; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human cognition based on experiences.

In an additional aspect, the knowledge domain may be an ontology of concepts representing a domain of knowledge. A thesaurus or ontology may be used as the domain knowledge and may also be used to associate various characteristics, attributes, symptoms, behaviors, sensitivities, parameters, clinical diagnoses and treatments of an individual afflicted with autism or person having any sensory, perceptual, cognitive, emotional/behavioral challenges, disabilities, or dysfunctions (e.g., neural dysfunction), and/or any other difficulties in communicating or engaging in social interaction with other persons. In one aspect, the term "domain" is a term intended to have its ordinary meaning. In addition, the term "domain" may include an area of expertise for a system or a collection of material, information, content and/or other resources related to a particular subject or subjects.

The term ontology is also a term intended to have its ordinary meaning. In one aspect, the term ontology in its broadest sense may include anything that can be modeled as ontology, including but not limited to, taxonomies, thesauri, vocabularies, and the like. For example, an ontology may include information or content relevant to a domain of interest or content of a particular class or concept. The ontology can be continuously updated with the information synchronized with the sources, adding information from the sources to the ontology as models, attributes of models, or associations between models within the ontology.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
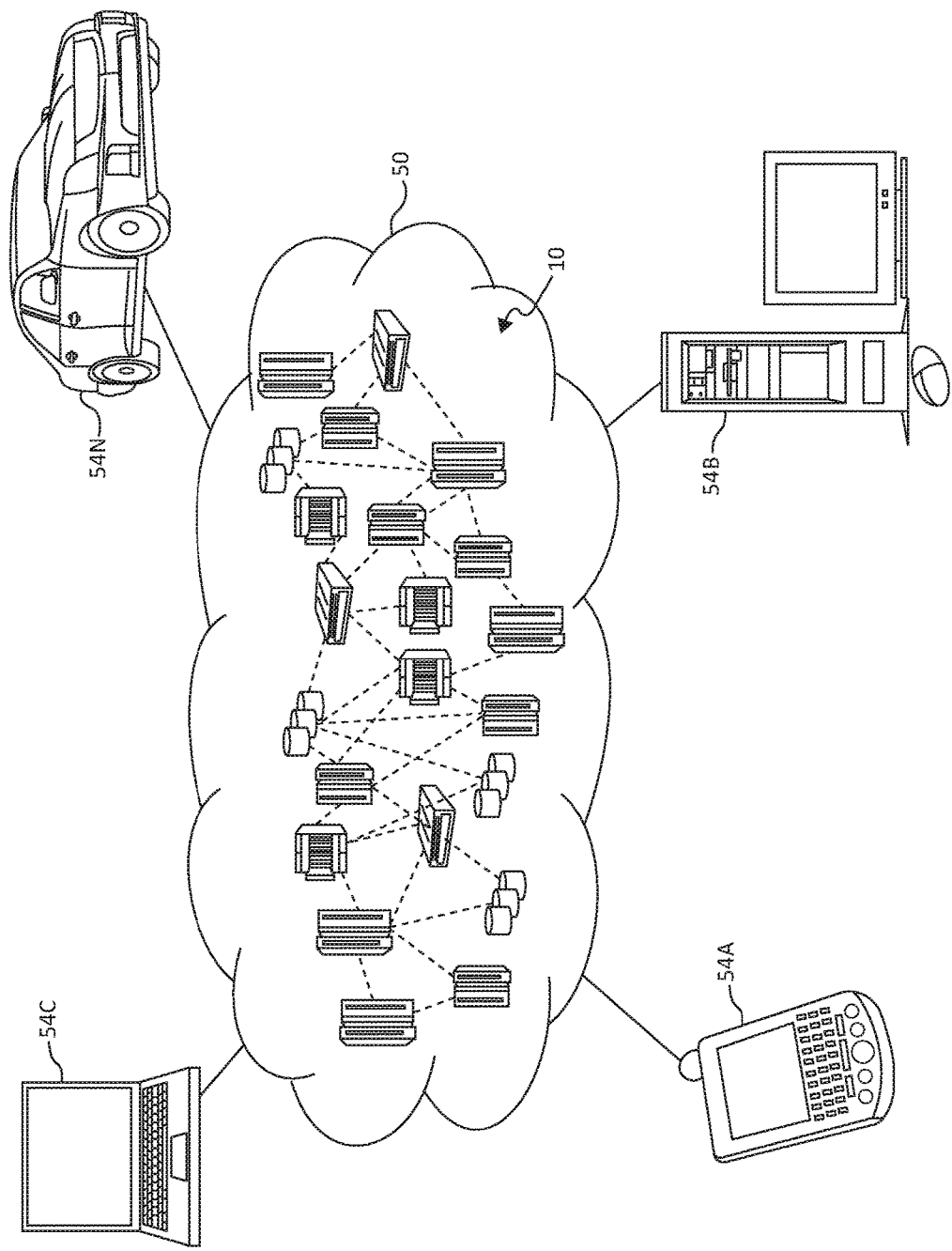
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
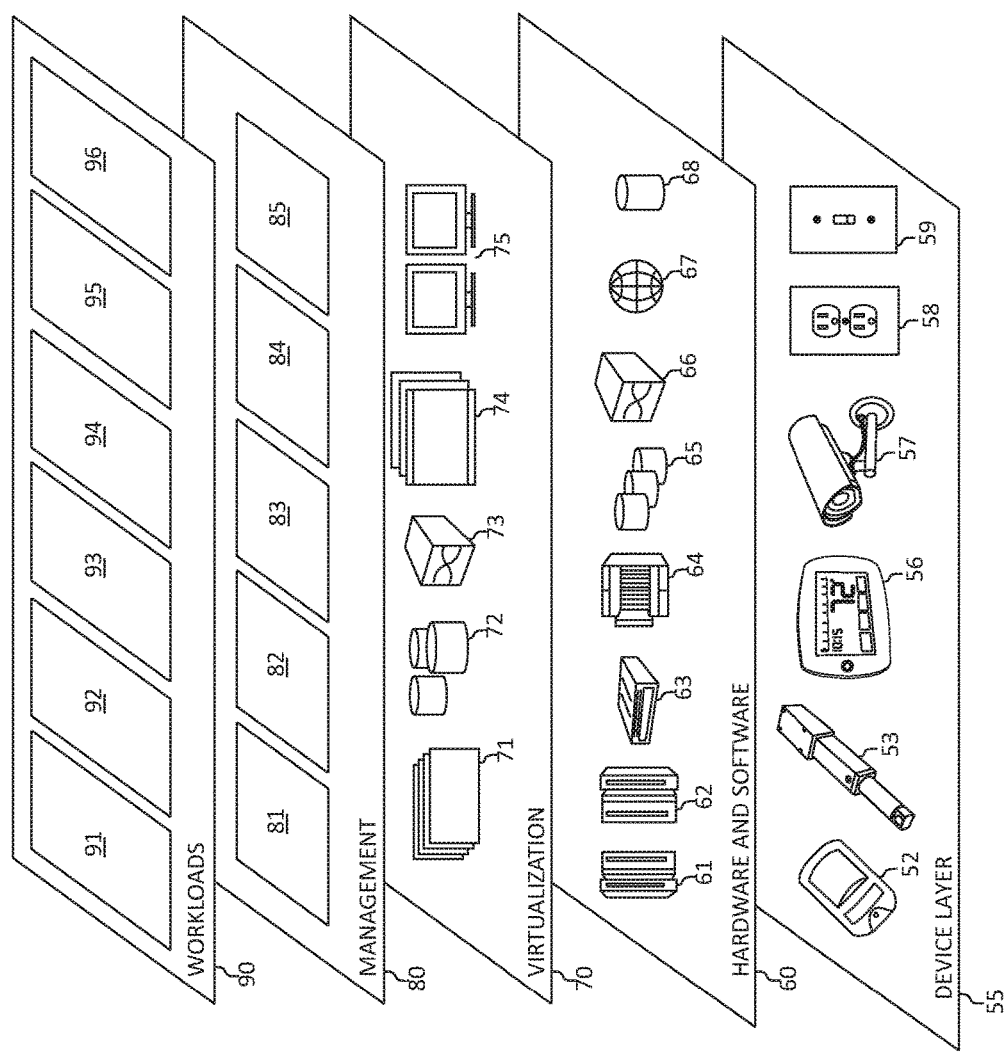
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for utilizing one or more HCEI devices. In addition, workloads and functions 96 for utilizing one or more HCEI devices may include such operations as data analytics, data analysis, and as will be further described, notification functionality. One of ordinary skill in the art will appreciate that the workloads and functions 96 for utilizing one or more HCEI devices may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for utilizing a human compound eye using internet of things ("HCEI") for obstacle protection of a user by a processor. One or more objects may be determined within an obstacle threshold distance in relation to a user according to data captured from one or more internet of things (IoT) devices associated with a wound dressing, a mobility assistance device, or a combination thereof. The user may be alerted of the one or more objects within the obstacle threshold distance.

Figure 4:
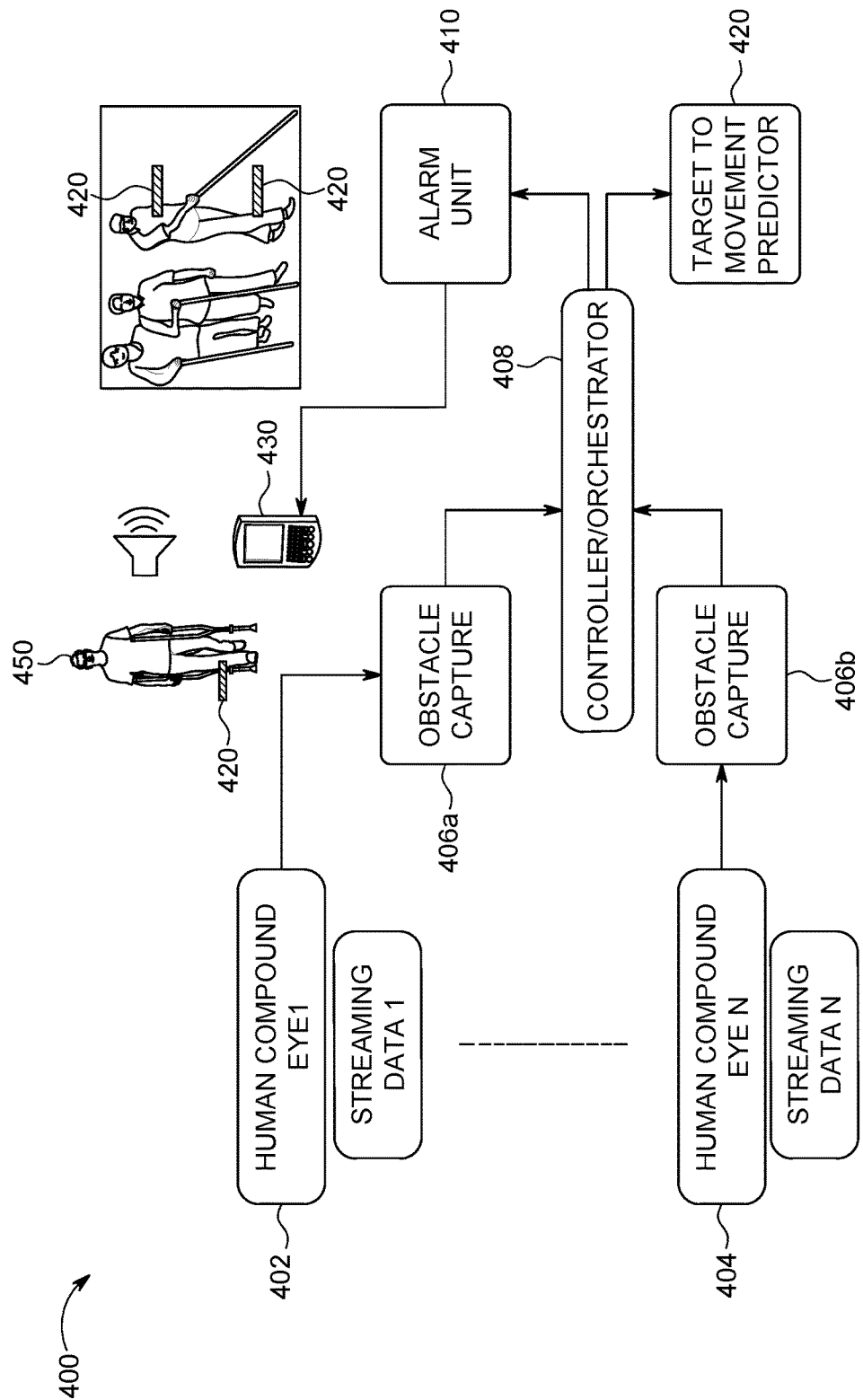
FIG. 4 is an additional block diagram depicting various user hardware and cloud computing components functioning in accordance with aspects of the present invention.

Turning now to FIG. 4, a block diagram of exemplary functionality 400 relating to utilizing one or more HCEI devices for obstacle protection of a user. In one aspect, one or more of the components, modules, services, applications, features and/or functions described in FIGS. 1-3 may be used in FIG. 4. For example, functionality 400 may be provided by the computer system/server 12 of FIG. 1.

As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIG. 4. With the foregoing in mind, the module blocks 400 may also be incorporated into various hardware and software components of a system for image enhancement in accordance with the present invention. Many of the functional blocks 400 may execute as background processes on various components, either in distributed computing components, or on the user device, or elsewhere, and generally unaware to the user.

Starting with blocks 402 and 404, one or more HCEI devices such as, for example, HCEI device 420 may be utilized for user 450 so as to stream (data 1 from block 402 and data N from block 404) data that captures and/or identifies one or more objects or obstacles within an obstacle threshold distance in relation to the user 450. The HCEI device 420 may capture (in real-time) one or more objects or obstacles and collect data of a selected and/or defined area within view of the HCEI device 420. The data may include one or more obstructing objects that may be stationary and/or moving at one or more speeds, velocities, and/or distances in relation to the user. For example, the HCEI device 420 may identify a street sign that is at least 20 feet from the user 450 and another person walking towards the user 450 at a determined speed, velocity, and distance. In one aspect, HCEI device 420 may be an internet of things (IoT) device such as, for example, one or more types of sensors, media devices, audio devices, or a combination thereof, associated with a wound dressing (e.g., a cast, brace, bandage, etc.) or a mobility assistance device (a cane, a wheelchair, etc., or a combination thereof). More specifically, the HCEI device 420 may be a camera such as, for example, a plenoptic burst camera. The HCEI device 420 may also be electric strips (e.g., unimorph piezo electric strips).

The streamed data (e.g., "streaming data 1" and "streaming data N") may stream, communicate, and/or send one or more objects or obstacles (e.g., "obstacle capture" 406a and 406b) via a wireless communication network and/or computer network to a centralized computing system such as, for example, a controller/orchestrator, as in block 408. That is, the HCEI device 420 may stream, communicate, and/or send the captured obstacles 406a and 406b (e.g., steps, street signs, humans, animals, objects that may cause harm to the user, etc.) to the computing system (e.g., a controller/orchestrator) so as to process, analyze, and/or collect the captured data.

Moreover, block 408 may also include determining an obstacle threshold distance for the user 450 by the computing system (e.g., a controller/orchestrator). In one aspect, the obstacle threshold distance may be a preconfigured setting or parameter. The obstacle threshold distance may also be adjusted, defined, modified, and/or changed according to one or more contextual factors and/or environments. For example, the obstacle threshold distance may be a radius of 10 feet while within an apartment building, but may have a radius of 100 feet in an outdoor environment. Alternatively, the obstacle threshold distance may be learned via one or more machine learning operations according to the various contextual factors. The computing system (e.g., a controller/orchestrator) may initialize a machine learning mechanism (which may be included therein) to learn, set, or modify the obstacle threshold distance for each of the one or more objects, parameters in the obstacle threshold distance map, activities of daily living (ADL), movement patterns of the user, contextual factors, or a combination thereof. For example, the obstacle threshold distance may be learned according to one or more machine learning models that learn one or more patterns, ADL, travel or mobility habits, and/or one or more preferences. For example, the obstacle threshold distance may be defined according to the machine learning operations learning that the user walks to and from work each day taking the same route while also walking to a nearby park each day after work. Accordingly, the obstacle threshold distance may be learned (e.g., a radius of 5 feet) according to the machine learning and/or in combination with the user's preferred settings or configurations for the route to and from work and also the route to and from the park.

Moreover, blocks 402, 404, and/or 408 may also include the computing system determining a real-time distance of the one or more objects from the user. The distance of the one or more objects from the user may be determined and/or stored in an obstacle threshold distance map so as to determine the one or more objects within the obstacle threshold distance. That is, the speed, the velocity, and/or the distance of the one or more objects (both stationary and/or in motion) in relation to the user. The determined speeds, the velocity, and/or the distance(s) may also be stored in an obstacle threshold distance map.

Moving now to block 410, a communication device such as, for example, an alarm unit may alert the user of the one or more objects within an obstacle threshold distance. That is, the communication device (e.g., the alarm unit) may provide one or more alerts, suggestions, communications, or a combination thereof to a graphical user interface ("GUI") of one or more various computing devices 430 (such as, for example, computing devices 54A-N shown in FIG. 2) to the user so as to modify mobility and/or a course of action to avoid the one or more objects within the obstacle threshold distance. That is, depending upon the speed, velocity, and/or distance of the captured obstacles to the user 450, the one or more alerts, suggestions, and/or communications may be provided to the user 450.

Turning now to block 420, a prediction operation (e.g., a target to movement predictor) may be performed so as to predict movement of one or more objects using data obtained from an obstacle threshold distance map, or data obtained in real-time from one or more IoT devices associated with the user.

In one aspect, the machine learning operations and modeling for protecting a user from one or more objects using an HCEI device, as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back-propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

In one aspect, the computing system 12/computing environment of functionality 400 may perform one or more calculations according to mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Figure 5:
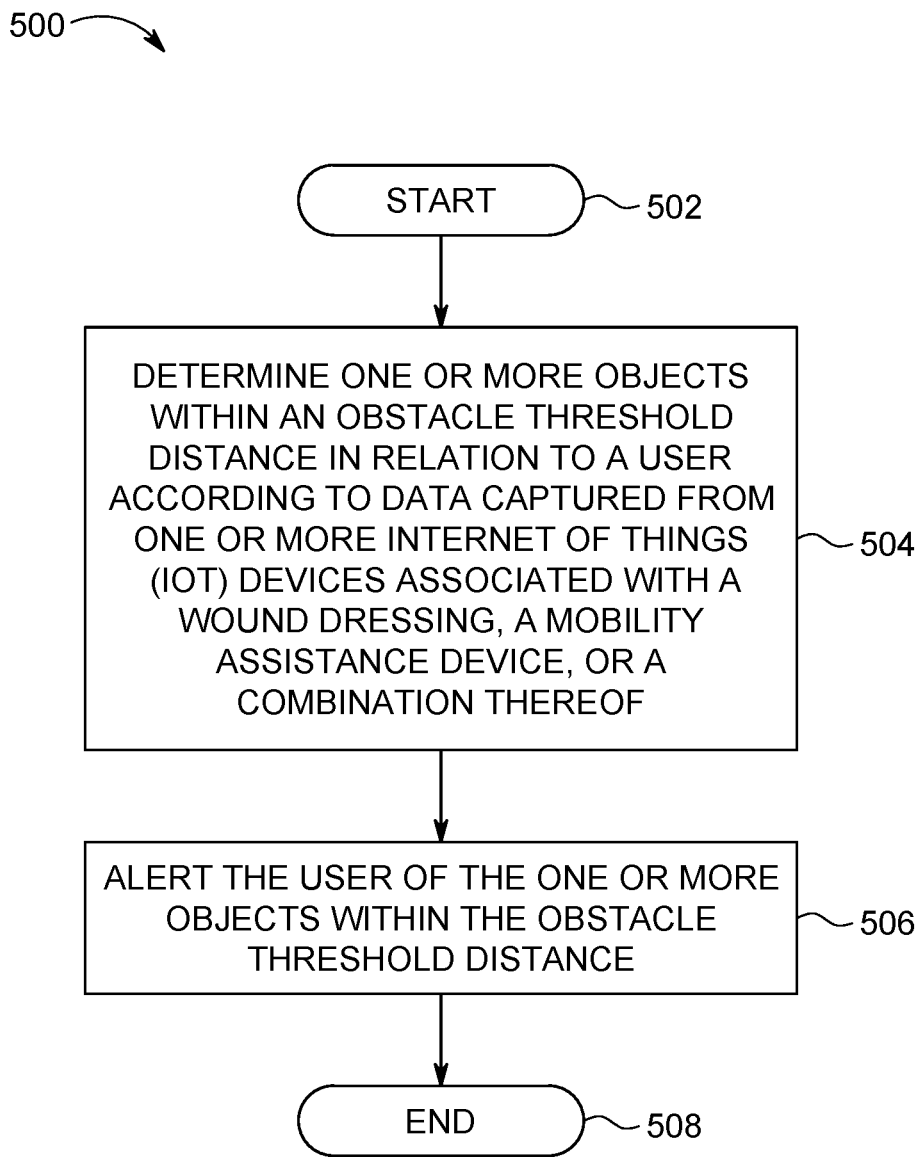
FIG. 5 is a flowchart diagram depicting an exemplary method for utilizing a human compound eye using an internet of things ("HCEI") for obstacle protection of a user, in which various aspects of the present invention may be realized.

Turning now to FIG. 5, a method 500 for utilizing a human compound eye using an internet of things ("HCEI") for obstacle protection of a user using a processor is depicted, in which various aspects of the illustrated embodiments may be implemented. The functionality 500 may be implemented as a method executed as instructions on a machine, where the instructions are included on at least one computer readable medium or one non-transitory machine-readable storage medium. In one aspect, the functionality, operations, and/or architectural designs of FIGS. 1-4 may be implemented all and/or in part in FIG. 5.

The functionality 500 may start in block 502. One or more objects may be determined within an obstacle threshold distance in relation to a user according to data captured from one or more internet of things (IoT) devices associated with a wound dressing, a mobility assistance device, or a combination thereof, as in block 504. The user may be alerted of the one or more objects within the obstacle threshold distance, as in block 506. The functionality 500 may end, as in block 508.

Figure 6:
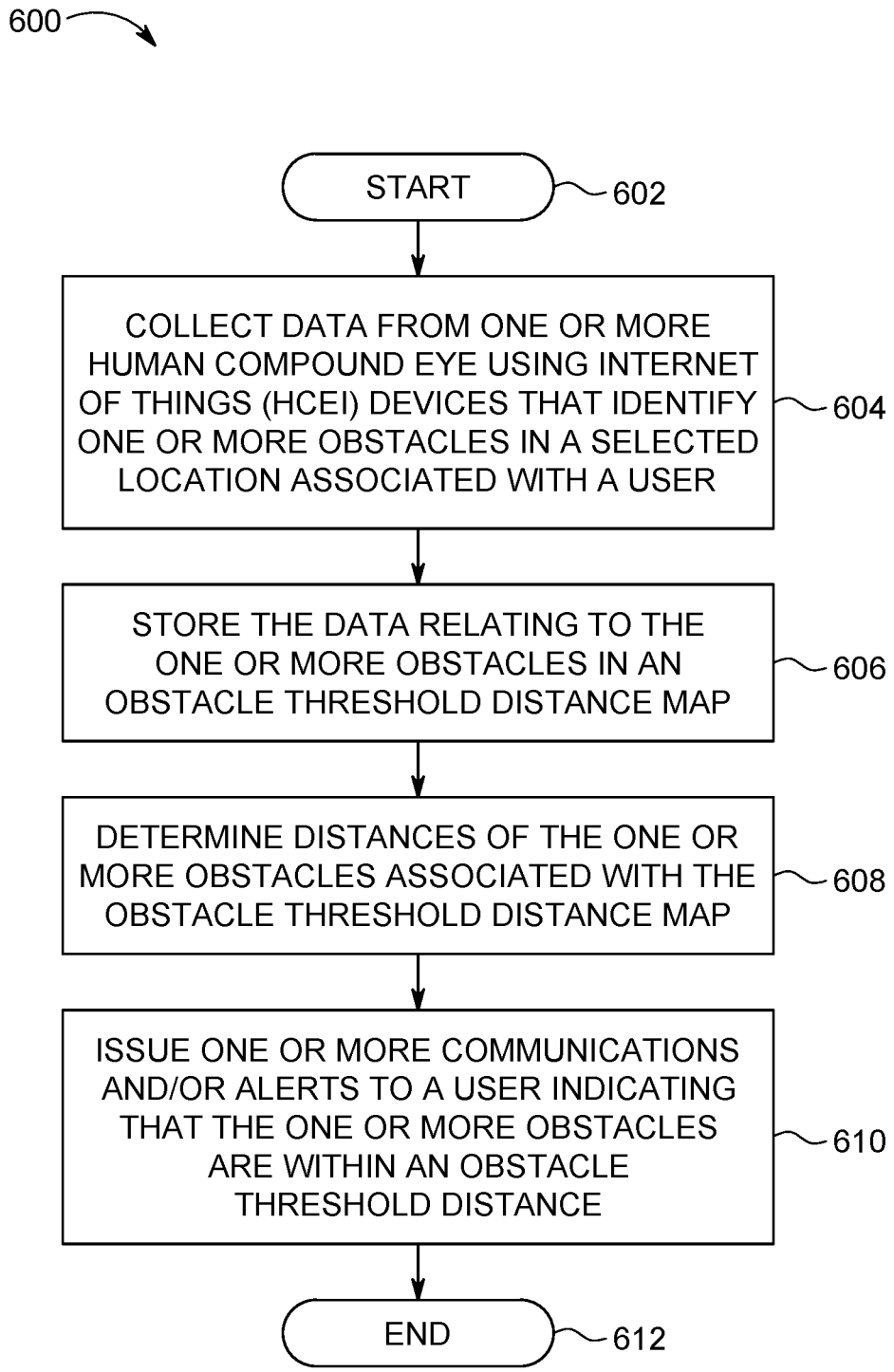
FIG. 6 is an additional flowchart diagram depicting an additional exemplary method for utilizing a human compound eye using an internet of things ("HCEI") for obstacle protection of a user, again in which various aspects of the present invention may be realized.

Turning now to FIG. 6, an additional method 600 for utilizing an HCEI device(s) for obstacle protection of a user using a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. In one aspect, the functionality, operations, and/or architectural designs of FIGS. 1-5 may be implemented all and/or in part in FIG. 6.

The functionality 600 may start in block 602. Data from one or more human compound eye using internet of things (HCEI) devices that identify one or more obstacles in a selected location associated with a user may be collected, as in block 604. The data relating to the one or more obstacles in an obstacle threshold distance map may be stored, as in block 606. Distances may be determined of the one or more obstacles associated with the obstacle threshold distance map, as in block 608. One or more communications and/or alerts may be issued to a user indicating that the one or more obstacles are within an obstacle threshold distance, as in block 610. The functionality 600 may end, as in block 612.

In one aspect, in conjunction with and/or as part of at least one block of FIGS. 5-6, the operations of methods 500 and/or 600 may include each of the following. The operations of methods 500 and/or 600 may determine a real-time distance of the one or more objects from the user, and store the distance of the one or more objects from the user in an obstacle threshold distance map so as to determine the one or more objects within the obstacle threshold distance.

A speed, velocity, distance, and/or combination thereof of the one or more objects may be determined in relation to the user. The determined speed, the velocity, and/or the distance may be stored in an obstacle threshold distance map. One or more parameters of the obstacle threshold distance map may be defined, set, configured, modified and/or updated by the user and/or a machine learning operation. The parameters may include obstacle threshold distance.

The operations of methods 500 and/or 600 may determine one or more objects via the one or more IoT devices embedded into one or more locations of the wound dressing, the mobility assistance device, or a combination thereof. The one or more IoT devices include one or more types of sensors, media devices, audio devices, or a combination thereof.

The operations of methods 500 and/or 600 may anticipate and/or predict movement of one or more objects using data obtained from an obstacle threshold distance map, or data obtained in real-time from one or more IoT devices associated with the user. A machine learning mechanism may be initialized to learn, set, or modify the obstacle threshold distance for each of the one or more objects, parameters in the obstacle threshold distance map, activities of daily living (ADL), movement patterns of the user, or a combination thereof.

The operations of methods 500 and/or 600 may provide one or more alerts, suggestions, communications, or a combination thereof via a graphical user interface to the user so as to modify mobility or a course of action to avoid the one or more objects within the obstacle threshold distance. Additionally, one or more alerts, suggestions, communications, or a combination thereof may also be provided to an entity (e.g., an alternative user, a caregiver associated with the user, an associate/family member of the user, etc.) via a graphical user interface of the entity that may be providing the communications, so as to assist with modifying the mobility or a course of action to avoid the one or more objects within the obstacle threshold distance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for enhancing communications for a user by a processor comprised within a computer in communication with one or more Internet of Things (IoT) devices, comprising:
   determining one or more objects within an obstacle threshold distance in relation to a user according to data captured from the one or more IoT devices associated with a wound dressing, a mobility assistance device, or a combination thereof; wherein the determining further comprises predicting movement of the one or more objects using data obtained from an obstacle threshold distance map or data obtained in real-time from one or more IoT devices associated with the user; and
   alerting the user of the one or more objects within the obstacle threshold distance.

2. The method of claim 1, further including:
   determining a real-time distance of the one or more objects from the user; and storing the distance of the one or more objects from the user in the obstacle threshold distance map so as to determine the one or more objects within the obstacle threshold distance.

3. The method of claim 1, further including determining a speed, a velocity, a distance, or a combination thereof of the one or more objects in relation to the user, wherein the determined speed, the velocity, the distance, or a combination thereof are stored in the obstacle threshold distance map.

4. The method of claim 1, further including identifying the one or more objects via the one or more IoT devices embedded into one or more locations of the wound dressing, the mobility assistance device, or a combination thereof, wherein the one or more IoT devices include one or more types of sensors, media devices, audio devices, or a combination thereof.

5. The method of claim 1, further including initializing a machine learning mechanism to learn, set, or modify the obstacle threshold distance for each of the one or more objects, parameters in the obstacle threshold distance map, activities of daily living (ADL), movement patterns of the user, or a combination thereof.

6. The method of claim 1, further including providing one or more alerts, suggestions, communications, or a combination thereof via a graphical user interface to the user so as to modify mobility or a course of action to avoid the one or more objects within the obstacle threshold distance.

7. A system for enhancing communications, comprising:
one or more computers with executable instructions that when executed cause the system to:
determine one or more objects within an obstacle threshold distance in relation to a user according to data captured from one or more Internet of Things (IoT) devices associated with a wound dressing, a mobility assistance device, or a combination thereof; wherein the determining further comprises predicting movement of the one or more objects using data obtained from an obstacle threshold distance map or data obtained in real-time from one or more IoT devices associated with the user; and
alert the user of the one or more objects within the obstacle threshold distance.

8. The system of claim 7, wherein the executable instructions:
determine a real-time distance of the one or more objects from the user; and
store the distance of the one or more objects from the user in the obstacle threshold distance map so as to determine the one or more objects within the obstacle threshold distance.

9. The system of claim 7, wherein the executable instructions determine a speed, a velocity, a distance, or a combination thereof of the one or more objects in relation to the user, wherein the determined speed, the velocity, the distance, or a combination thereof are stored in the obstacle threshold distance map.

10. The system of claim 7, wherein the executable instructions identify the one or more objects via the one or more IoT devices embedded into one or more locations of the wound dressing, the mobility assistance device, or a combination thereof, wherein the one or more IoT devices include one or more types of sensors, media devices, audio devices, or a combination thereof.

11. The system of claim 7, wherein the executable instructions initialize a machine learning mechanism to learn, set, or modify the obstacle threshold distance for each of the one or more objects, parameters in the obstacle threshold distance map, activities of daily living (ADL), movement patterns of the user, or a combination thereof.

12. The system of claim 7, wherein the executable instructions provide one or more alerts, suggestions, communications, or a combination thereof via a graphical user interface to the user so as to modify mobility or a course of action to avoid the one or more objects within the obstacle threshold distance.

13. A computer program product for enhancing communications for a user by a processor comprised within a computer in communication with one or more Internet of Things (IoT) devices, the computer program product comprising a non-transitory computer-readable storage medium having computer-readable program code portions stored therein, the computer-readable program code portions comprising:
an executable portion that determines one or more objects within an obstacle threshold distance in relation to a user according to data captured from the one or more IoT devices associated with a wound dressing, a mobility assistance device, or a combination thereof; wherein the determining further comprises predicting movement of the one or more objects using data obtained from an obstacle threshold distance map or data obtained in real-time from one or more IoT devices associated with the user; and
an executable portion that alerts the user of the one or more objects within the obstacle threshold distance.

14. The computer program product of claim 13, further including an executable portion that:
determines a real-time distance of the one or more objects from the user; and
stores the distance of the one or more objects from the user in the obstacle threshold distance map so as to determine the one or more objects within the obstacle threshold distance.

15. The computer program product of claim 13, further including an executable portion that determines a speed, a velocity, a distance, or a combination thereof of the one or more objects in relation to the user, wherein the determined speed, the velocity, the distance, or a combination thereof are stored in the obstacle threshold distance map.

16. The computer program product of claim 13, further including an executable portion that identifies the one or more objects via the one or more IoT devices embedded into one or more locations of the wound dressing, the mobility assistance device, or a combination thereof, wherein the one or more IoT devices include one or more types of sensors, media devices, audio devices, or a combination thereof.

17. The computer program product of claim 13, further including an executable portion that
initializes a machine learning mechanism to learn, set, or modify the obstacle threshold distance for each of the one or more objects, parameters in the obstacle threshold distance map, activities of daily living (ADL), movement patterns of the user, or a combination thereof.

18. The computer program product of claim 13, further including an executable portion that provides one or more alerts, suggestions, communications, or a combination thereof via a graphical user interface to the user so as to modify mobility or a course of action to avoid the one or more objects within the obstacle threshold distance.

* * * * *